US009870697B2

(12) United States Patent
Frew et al.

(10) Patent No.: US 9,870,697 B2
(45) Date of Patent: Jan. 16, 2018

(54) METHOD, COMPUTER-READABLE STORAGE DEVICE AND APPARATUS FOR PROVIDING A COLLABORATIVE STANDALONE AREA MONITOR

(71) Applicants: AT&T Mobility II LLC, Atlanta, GA (US); AT&T Intellectual Property I, L.P., Atlanta, GA (US)

(72) Inventors: Steven William Frew, Round Rock, TX (US); Larry B. Pearson, San Antonio, TX (US); Mark Stockert, San Antonio, TX (US); Randolph Wohlert, Austin, TX (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 231 days.

(21) Appl. No.: 14/109,525

(22) Filed: Dec. 17, 2013

(65) Prior Publication Data
US 2015/0170505 A1   Jun. 18, 2015

(51) Int. Cl.
*G08B 1/08* (2006.01)
*B60R 25/10* (2013.01)
(Continued)

(52) U.S. Cl.
CPC .......... *G08B 25/10* (2013.01); *B60R 25/102* (2013.01); *B60R 25/305* (2013.01); *G08B 13/19647* (2013.01); *G08B 25/009* (2013.01); *G08B 29/188* (2013.01); *H04N 7/181* (2013.01); *G08B 13/19695* (2013.01); *G08B 13/19697* (2013.01)

(58) Field of Classification Search
CPC .......... B60R 25/1004; B60R 21/01538; B60R 2001/1223; B60R 2001/1253; B60R 25/102; B60R 25/305; B60R 25/33; G08B 13/00; G08B 13/2491; G08B 23/00; G08B 13/19695; B60W 2050/046
USPC .......... 340/539.22, 539.26, 536.24, 340/426.1–426.36, 901
See application file for complete search history.

(56) References Cited

U.S. PATENT DOCUMENTS 6,542,076 B1 * 4/2003 Joao ...................... B60R 25/018
                                                      307/10.2
6,992,580 B2 * 1/2006 Kotzin ............... G08B 21/0453
                                                      340/539.11
(Continued)

FOREIGN PATENT DOCUMENTS

EP      1225235 B1 *  8/2005  .......... C21D 8/0273

OTHER PUBLICATIONS

Wikipedia, Electro-optical sensor, all pages, accessed May 21, 2017.*
(Continued)

*Primary Examiner* — Emily C Terrell

(57) ABSTRACT

A method, computer-readable storage device and apparatus for providing collaborative area monitoring are disclosed. For example, the method monitors the area via a plurality of sensors, wherein the plurality of sensors comprises an optical sensor and a positioning sensor, detects an alarm condition, activates one of the plurality of sensors to capture information associated with the alarm condition, and sends a request for assistance to a neighboring standalone area monitor using a wireless communications protocol.

20 Claims, 8 Drawing Sheets

(51) Int. Cl.
*G08B 25/10* (2006.01)
*H04N 7/18* (2006.01)
*G08B 13/196* (2006.01)
*G08B 25/00* (2006.01)
*G08B 29/18* (2006.01)
*B60R 25/102* (2013.01)
*B60R 25/30* (2013.01)

(56) References Cited

U.S. PATENT DOCUMENTS

| | | |
|---|---|---|
| 7,174,176 B1 | 2/2007 | Liu |
| 7,355,508 B2 * | 4/2008 | Mian ............ B60R 25/00 340/425.5 |
| 7,554,440 B2 * | 6/2009 | Kadaba ............ G01N 33/0075 340/539.22 |
| 7,783,300 B2 | 8/2010 | Sinha |
| 7,971,251 B2 | 6/2011 | Sinha |
| 8,024,330 B1 | 9/2011 | Franco et al. |
| 8,086,183 B2 | 12/2011 | Roh et al. |
| 8,150,465 B2 | 4/2012 | Zhang et al. |
| 8,160,764 B2 * | 4/2012 | Choi et al. ............ 701/24 |
| 8,351,454 B2 | 1/2013 | Jain et al. |
| 8,548,423 B2 | 10/2013 | Rao |
| 2002/0198632 A1 * | 12/2002 | Breed ............ G01S 13/931 701/1 |
| 2004/0017300 A1 * | 1/2004 | Kotzin ............ G08B 21/0453 340/870.11 |
| 2005/0088297 A1 * | 4/2005 | Miyajima ............ A61B 5/0002 340/539.12 |
| 2008/0012693 A1 * | 1/2008 | Shimomura ........ B60R 25/102 340/426.1 |
| 2008/0297330 A1 * | 12/2008 | Jeon .............. B60R 25/102 340/426.11 |
| 2009/0066488 A1 | 3/2009 | Qiahe et al. |
| 2009/0085873 A1 * | 4/2009 | Betts ............ G08B 13/1427 345/169 |
| 2011/0025846 A1 * | 2/2011 | Garrett ............ 348/143 |
| 2011/0112720 A1 * | 5/2011 | Keep et al. ............ 701/36 |
| 2011/0130112 A1 | 6/2011 | Saigh et al. |
| 2012/0150966 A1 | 6/2012 | Fan et al. |
| 2012/0176239 A1 | 7/2012 | Preden et al. |
| 2012/0233246 A1 | 9/2012 | Guemez |
| 2013/0278441 A1 * | 10/2013 | Rubin ............ G08G 9/02 340/905 |
| 2013/0342333 A1 * | 12/2013 | Hutchings ............ 340/435 |

OTHER PUBLICATIONS

Future Technologies, optical sensors and switches, all pages, accessed May 21, 2017.*

Optical sensor technologies, all pages, accessed May 21, 2017.*

* cited by examiner

METHOD, COMPUTER-READABLE STORAGE DEVICE AND APPARATUS FOR PROVIDING A COLLABORATIVE STANDALONE AREA MONITOR

BACKGROUND

A home or a business can deploy a fixed security system that is used to monitor and protect the home or business. However, since a fixed security system is often designed to protect a particular area, suspicious activities outside of the monitored area are often ignored. For example, a fixed security system for a first business establishment will only protect that first business establishment. A second neighboring business establishment may be protected by a separate second fixed security system. If the first security system sounds an alarm because the premises of the first business establishment has been breached, there is no collaboration between the two separate distinct security systems since the second fixed security system is only configured to monitor the premises of the second neighboring business.

SUMMARY

In one embodiment, the present disclosure discloses a method, computer-readable storage device and apparatus for providing collaborative area monitoring. For example, the method monitors the area via a plurality of sensors, wherein the plurality of sensors comprises an optical sensor and a positioning sensor, detects an alarm condition, activates one of the plurality of sensors to capture information associated with the alarm condition, and sends a request for assistance to a neighboring standalone area monitor using a wireless communications protocol.

In another embodiment, the method monitors the area via a plurality of sensors, wherein the plurality of sensors comprises an optical sensor and a positioning sensor, receives a request for assistance due to an alarm condition from a neighboring standalone area monitor using a wireless communications protocol, determines whether the standalone area monitor is authorized to provide the assistance, and activates one of the plurality of sensors to capture information associated with the alarm condition when providing the assistance is determined to be authorized.

In another embodiment, the method receives the report of the alarm condition from a first standalone area monitor having a plurality of sensors that comprises an optical sensor and a positioning sensor for monitoring an area, wherein the report is received via a wireless communication protocol, receives information captured by the optical sensor associated with the alarm condition, analyzes the information to verify the alarm condition, and sends a notification of the alarm condition to a predefined entity.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to providing a collaborative standalone area monitor and, more particularly, to a method, computer-readable storage device and apparatus for providing a standalone area monitor (SAM) that collaborates with other standalone area monitors. As discussed above, there are certain situations where a user may want to monitor an area on an ad hoc basis. In other words, a user may want to monitor an area (broadly a monitored area) that is not a fixed location such as a home or a business. For example, the area may comprise a vehicle such as a car, a truck, a bus, a recreational vehicle (RV), a motorcycle, a scooter, a bicycle, or a water vehicle (such as a motor boat, a sail boat, a kayak, a canoe, and the like). The area may also be a "non-vehicle" location, such as a campsite, a booth (e.g., in a tradeshow), a stall (e.g., a horse stall in a barn), or a tent. The above examples are not exhaustive. In sum, the areas that can benefit from the collaborative standalone area monitor of the present disclosure are areas that are moveable and/or transient in nature. In other words, vehicles can readily move from one location to another location. Similarly, areas such as campsites, booths, stalls, or tents are generally occupied only for a brief period of time, i.e., the area is transient from the perspective of the occupants. More specifically, the collaborative standalone area monitor of the present disclosure provides several key features such as the ability to be moved from one location to another location (broadly portability), the ability to collaborate with other standalone area monitors (broadly collaborative communication), and the ability to communicate with a network (broadly centralized or distributed reporting). Each of these features will be described in greater detail below.

Figure 1:
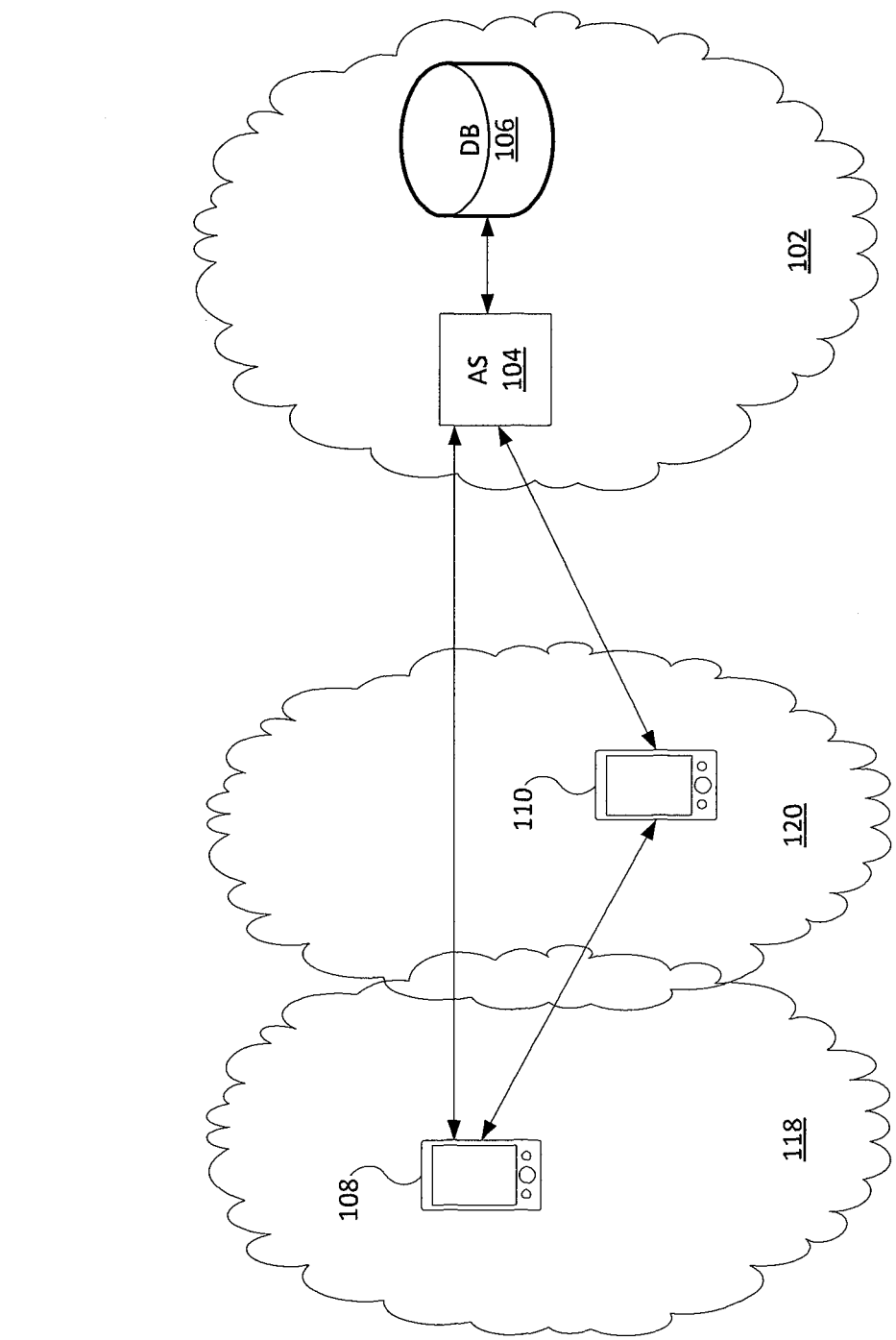
FIG. 1 illustrates one example of a communications network of the present disclosure.

FIG. 1 is a block diagram depicting one example of a communications network 100. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

In one embodiment, the communications network 100 may include a core network 102. The core network 102 may include an application server (AS) 104 and a database (DB)

Figure 8:
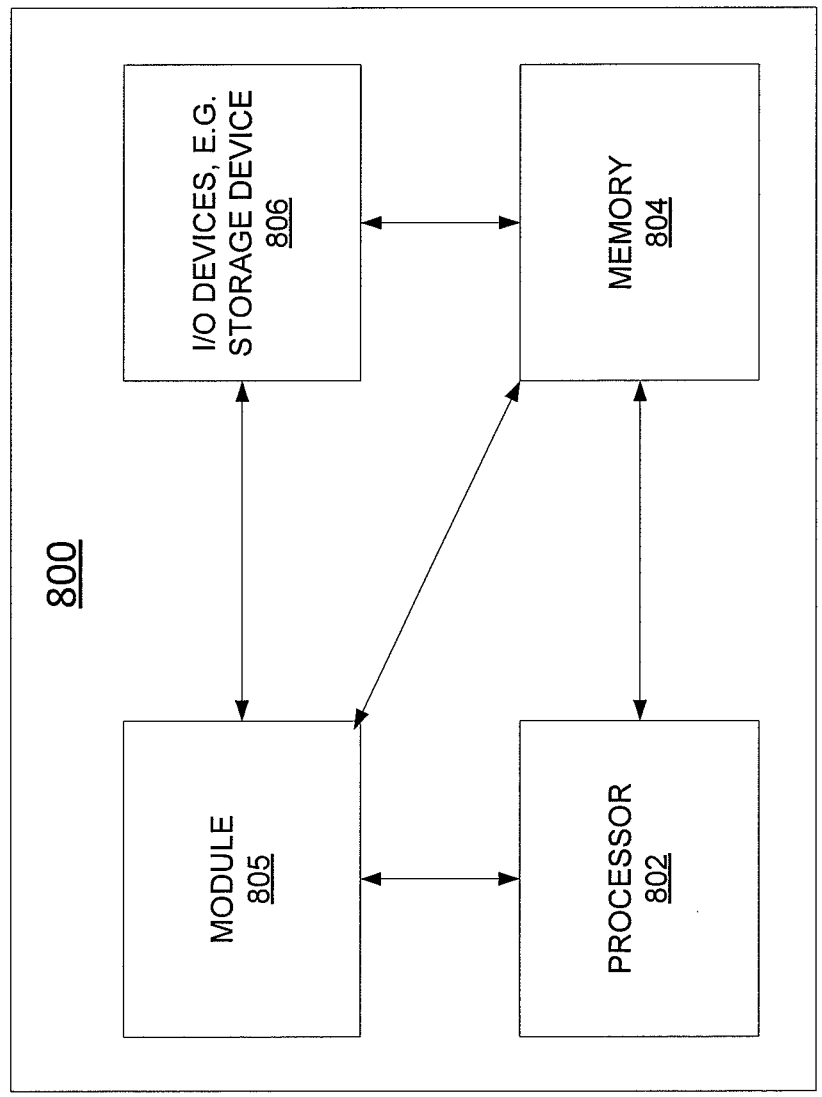
FIG. 8 illustrates a high-level block diagram of a general-purpose computer suitable for use in performing the functions described herein.

106. The AS 104 may be deployed as a hardware device embodied as a general purpose computer (e.g., the general purpose computer 800 as illustrated in FIG. 8). In one embodiment, the AS 104 may perform the methods and functions described herein (e.g., the method 700 discussed below).

In one embodiment, the AS 104 may perform various functions or operations as described herein, for example, interacting with endpoint devices, e.g., the collaborative standalone area monitors of the present disclosure. In one embodiment, the DB 106 may store subscriber information (e.g., the subscriber's contact information, the subscriber's mobile endpoint telephone number, the subscriber's collaborative standalone area monitor identification information, subscriber filters or preferences and the like.

In one embodiment, the communications network may include one or more access networks (e.g., a cellular network, a wireless network, a wireless-fidelity (Wi-Fi) network, a PSTN network, an IP network, and the like) that are not shown to simplify FIG. 1. In one embodiment, the communications network 100 in FIG. 1 is simplified and it should be noted the communications network 100 may also include additional network elements (not shown), such as for example, border elements, gateways, firewalls, routers, switches, call control elements, various application servers, and the like.

In one embodiment, the communications network 100 may include mobile endpoint devices 108 and 110. Although only two mobile endpoint devices are illustrated in FIG. 1, it should be noted that any number of mobile endpoint devices may be deployed. In one embodiment, each of the mobile endpoint devices 108 and 110 comprises a standalone area monitor (broadly a standalone area monitoring device). For example, mobile endpoint device 108 is a first standalone area monitor, and mobile endpoint device 110 is a second standalone area monitor.

In one embodiment, the mobile endpoint device 108 may be referred to as a sender, a sender mobile endpoint device, a sender device, a sending standalone area monitor and the like. In one embodiment, the mobile endpoint device 110 may be referred to as a recipient, a recipient mobile endpoint device, a recipient device, a recipient standalone area monitor and the like. In one embodiment, the users of the mobile endpoint devices 108 and 110 may each also be a subscriber of a service provider of the communications network 102 that may provide communications services such as cellular network communications services, data transmission services, Voice over Internet Protocol (VoIP) services, and the like.

In one embodiment, the mobile endpoint devices 108 and 110 may also communicate over an open wireless communications protocol, such as for example, Bluetooth®, Zigbee®, near field communications protocol, other RF communications, wireless-fidelity (Wi-Fi) communications, infrared communications (e.g., IrDA), and the like. In one embodiment, the open communications protocol may provide a personal communication area network having a range 118 for the mobile endpoint device 108 and the personal communication area having a range 120 for the mobile endpoint device 110. As shown in FIG. 1, the range 118 and range 120 are overlapped indicating that the mobile endpoint devices 108 and 110 are able to directly communicate with each other without the need of a communications network, e.g., network 102. In other words, the open communications protocol coverage area of 118 and 120 overlap so that the two mobile endpoint devices may communicate directly with each other (e.g., device to device communication) without the need to access a network service such as cellular service or Wi-Fi service. For example, the mobile endpoint device 108 may detect that the mobile endpoint device 110 is within range and available to receive a message. In one embodiment, a general message or request for assistance may be broadcasted by the mobile endpoint device 108. The message may be received by any endpoint device (e.g., the mobile endpoint device 110) within the open communications protocol coverage area of the mobile endpoint device 108.

In one embodiment, the mobile endpoint devices 108 and 110 may subscribe to one or more services for providing collaborative monitoring provided by a service provider of the communications network 102. The various features of this service are described below.

In one embodiment, the mobile endpoint device 108 may also consent to being traceable, i.e., consenting to be identified by geographic location, if necessary or appropriate. For example, if the mobile endpoint device 108 is the sender device and is triggering an alarm indicating an alarm condition, e.g., a vehicle is being broken into, a vehicle is being moved, a tent is being entered, a large animal has been detected within a campsite and the like, then the AS 104 is given permission to identify and track the location of mobile endpoint device 108.

In one embodiment, the mobile endpoint device 110 may be the recipient device. In one embodiment, the mobile endpoint device 110 may pre-define one or more monitoring filters. The one or more monitoring filters allow the mobile endpoint device 110 to determine the degree of collaboration that mobile endpoint device 110 is willing to engage in when called upon to assist another mobile endpoint device.

For example, the user of mobile endpoint device 110 may have a number of choices or levels of collaboration to select from. In one embodiment, the levels of collaboration (broadly collaboration modes) may comprise: 1) full collaboration, 2) limited collaboration, 3) no collaboration, and the like. In one embodiment, when the mode or filter for "full collaboration" is selected, the recipient device will assist the sender device to the fullest extent possible. For example, the recipient device will activate one or more of the sensors that are within the control of the recipient device. For example, if the recipient device has a camera and a microphone, it will activate the camera and microphone to record images and sounds that are within range of these sensors. The recipient device will also store these recordings (e.g., images, videos, and audio files) locally on a local storage device and/or transmit them immediately to an application server, e.g., operated by a service provider. In fact, in one embodiment, the recipient device may activate external signaling devices, (e.g., horns, lights, communication devices and the like) that are external to the physical standalone package of the recipient device itself, e.g., the horn of a car, the headlights of a car, the communication device of a car, e.g., an On-Star® warning system. Thus, a sender device 108 that detects a break-in of the vehicle that the sender device 108 is currently monitoring, will solicit assistance from other neighboring recipient devices. It is often the case that the sender device 108 and the vehicle's alarm system will likely be disabled by the intruder upon entry. Thus, collaborating recipient devices in the immediate vicinity may assist the sender device 108 by capturing images and sounds of the break-in and possibly, causing a neighboring car's horn and headlights to be triggered to draw attention to the immediate area. This is accomplished even though the neighboring car is not being broken into.

In one embodiment, when the mode or filter for "limited collaboration" is selected, the recipient device will assist the sender device only in a limited capacity. For example, the recipient device may simply activate its camera and microphone to capture the images and the sound of the break-in. The stored files (e.g., images, videos, audio files) can be stored locally, but will not be transmitted remotely to the application server of a service provider. The recipient device will not activate any external signaling devices as discussed above. One scenario where the "limited collaboration" may be appropriate is during a holiday celebration, e.g., a Fourth of July celebration, where a large number of fireworks may be triggered in a neighborhood. Under such scenarios, there may be large instances of false positives as to the reporting of break-ins by neighboring collaborative standalone area monitors of the present disclosure. As such, a user may simply set the collaborative standalone area monitor to a "limited collaboration" mode where images and sounds are recorded locally but not sent. It should be noted that the sending of video and sound files over a network, e.g., a cellular network, may consume a substantial amount of bandwidth and cost to the user. As such, the sending of such video and sound files should be done in a judicious manner.

Additional factors to be considered for transmission of these stored files through the network will be further described below. Furthermore, it should be noted that the nature of the limited collaboration is not limited to the example described above. In other words, "limited collaboration" encompasses intentionally limiting one or more features of a standalone area monitor, e.g., assisting in all aspects without sending the stored files through the network, assisting in all aspects without sounding the horn of a car since the car is situated in a "no horn sounding" zone of a city, assisting in all aspects without activating the lights of a car since the car's battery is low, assisting in all aspects without storing the video files because the local storage device is too full, and so on. In other words, under the "limited collaboration" mode, the user may selectively configure the standalone area monitor (e.g., turning on or off a feature, or setting a triggering threshold for a feature, e.g., activating the camera only for 5 minutes, sounding the horn of a car only for one minute, sending the video file only when a Wi-Fi access network is detected, entering the "limited collaboration" mode only between the hours of 9 pm-7 am, and so on) in such a manner that only a subset of the features of the standalone area monitor will be provided.

In one embodiment, when the mode or filter for "no collaboration" is selected, the recipient device will not assist the sender device. For example, the recipient device will not activate any of the sensors that are within the control of the recipient device. In fact, the recipient device will not activate any of the signaling devices that are external to the collaborative standalone area monitor. One scenario could be that the battery on the collaborative standalone area monitor is simply too low to provide collaborative assistance. Another scenario could be that collaborative standalone area monitor is being used in a company issued vehicle or a government agency vehicle where such collaboration is specifically prohibited by corporate or governmental policies.

Figure 2:
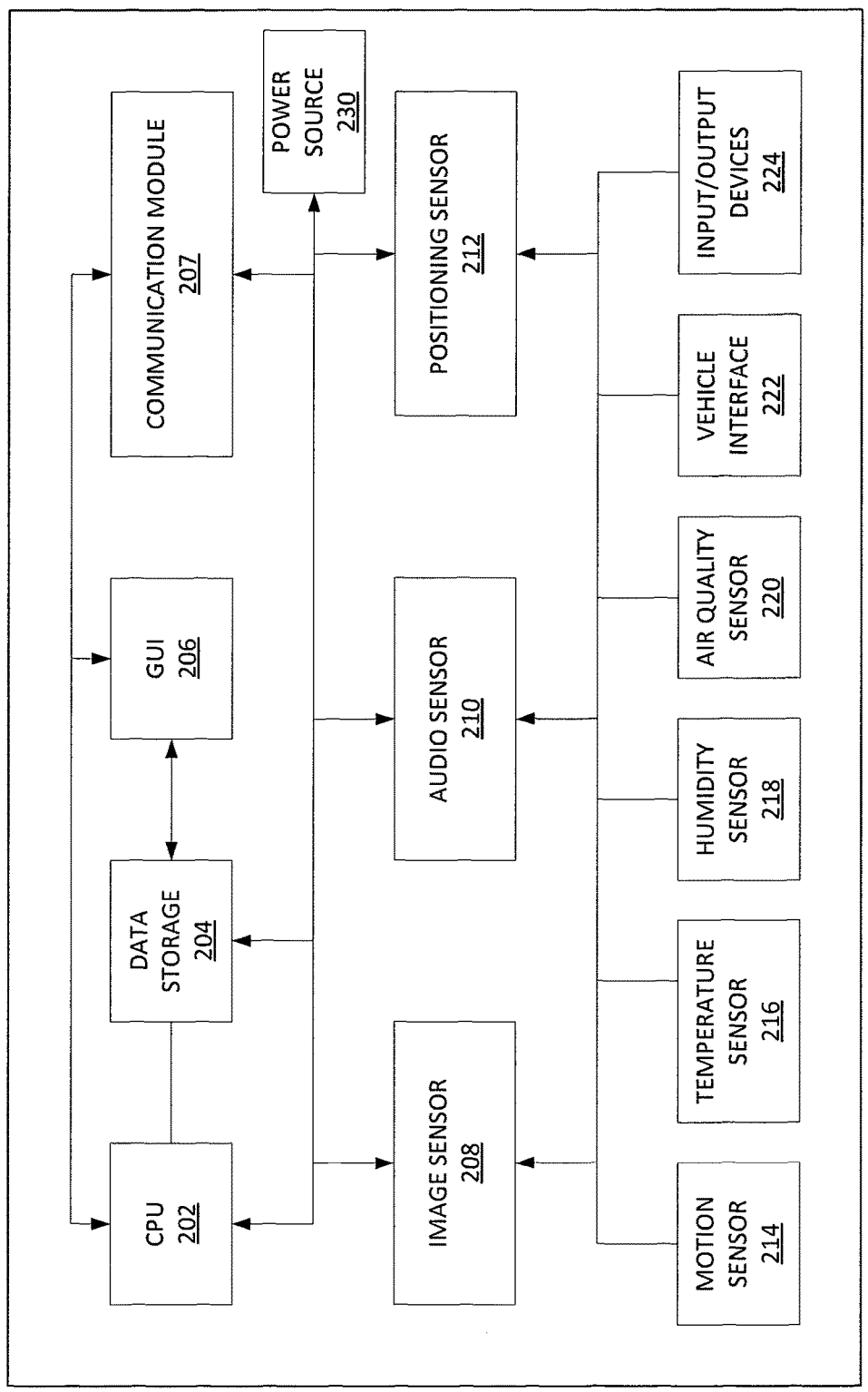
FIG. 2 illustrates a block diagram of a standalone area monitor of the present disclosure.

FIG. 2 illustrates a block diagram of an illustrative standalone area monitor (e.g., 108 or 110) of the present disclosure. In one embodiment, the standalone area monitor 108 may include a computer processing unit (CPU) or any type of hardware processor or controller 202 and a data storage unit 204, e.g., a memory device or a memory integrated circuit. The CPU 202 may perform the various operations and/or functions as described herein. For example, the CPU 202 may analyze various information collected by the various sensors for determining whether an alarm condition has been detected for a monitored area, i.e., verifying the validity of the reported alarm condition. In another example, the CPU 202 may detect a request for assistance by a neighboring standalone area monitor 110 and may provide one or more features available to the standalone area monitor 108. In one embodiment, the standalone area monitor 108 may be deployed in a vehicle or a non-vehicle monitored area such as a tent, a campsite, a booth, or a stall.

In one embodiment, the data storage unit 104 may include a computer-readable storage device for storing various information such as the 1) information pertaining to the standalone area monitor such as a unique identification number (e.g., a unique alphanumeric string) for the standalone area monitor, user preferences as to the collaborative mode that is selected for the standalone area monitor, one or more thresholds for each feature of the standalone area monitor, and so on, 2) information captured by the sensors of the standalone area monitor in response to an alarm condition being detected for the monitored area, 3) information captured by the sensors of the standalone area monitor in response to a request from another standalone area monitor requesting assistance.

In one embodiment, the standalone area monitor 108 may optionally include a graphical user interface (GUI) 206. The GUI 206 may be a touch screen. The GUI 206 may be used to display information to a user and receive information from the user. The GUI 206 may receive information regarding the collaborative mode of the standalone area monitor 108, the threshold to be used for each feature of the standalone area monitor, and/or an input (e.g., an automatic input or a manual input by the user) to activate the various sensors of the standalone area monitor. The GUI 206 may also display or provide information (e.g., via a voice or graphically) to the user. It should be noted that the GUI may be implemented on a communications device, e.g., a smart phone that is used to communicate or to be connected with the standalone area monitor 108.

In one embodiment, the standalone area monitor 108 may also include a communication module 207. The communication module 207 may be used to provide wireless communication access to the standalone area monitor, e.g., cellular network access or Wi-Fi network access (e.g., texting, emailing, messaging, data transmission and the like) that can be used to transmit the stored sensor collected information to an application server of a service provider. In one embodiment, the communication module 207 also allows the standalone area monitors to directly communicate with each other, e.g., using open short range communication protocols (e.g., Bluetooth®, Zigbee®, near field communications, other radio frequency (RF) communications, Wi-Fi, infrared communications (e.g., IrDA), and the like). In one embodiment, the communication module 207 may have an optional wired interface, e.g., a physical hardware connector that will allow the standalone area monitor 108 or 110 to communicate with a network or other devices via a wired connection.

In one embodiment, the standalone area monitor 108 or 110 may also include one or more various modules or sensors for monitoring various conditions of a monitored area. In one embodiment, an image sensor 208, e.g., an optical sensor such as a camera is deployed to capture an image or a sequence of images (e.g., a video) of the monitored area or an area that is outside or external to the monitored area. For example, when an alarm condition is detected, the camera 208 can be activated to capture the imagery of the monitored area. If the monitored area is a vehicle, the camera 208 may capture imagery of the interior compartment of the vehicle, e.g., imagery of individuals within the vehicle, e.g., an intruder within the vehicle. In another embodiment, if the vehicle has transparent windows, then the captured imagery may actually capture scenes that are external to the vehicle, e.g., imagery outside the back or side windows of the vehicle if the standalone area monitor is mounted on a visor facing the back of the vehicle. Alternatively, if the standalone area monitor employs a plurality of image sensors or a plurality of reflectors, then additional views of the vehicle compartment or scenes that are external to the vehicle can be captured. Furthermore, if the image sensor 208 is mounted on a moveable base with an actuator, then the image sensor can be activated and controlled to scan a predefined range of angles (e.g., 120°-360° and the like).

In one embodiment, the image sensor 208 may be activated even when there is no alarm condition. In other words, the camera 208 may be part of the overall system that is tasked with the initial detection of the alarm condition, e.g., detecting a change in imagery within the compartment of a supposedly empty vehicle, e.g., comparing an image of an empty vehicle compartment to an image of a person sitting inside the vehicle compartment.

In one embodiment, an audio sensor 210, e.g., a microphone is deployed to capture sounds of the monitored area or an area that is outside or external to the monitored area, e.g., using a microphone deployed on the exterior of the vehicle. For example, when an alarm condition is detected, the audio sensor 210 can be activated to capture the sound of the monitored area or an area that is outside or external to the monitored area. In one embodiment, the audio sensor 210 may be activated even when there is no alarm condition. In other words, the microphone 210 may be part of the overall system that is tasked with the initial detection of the alarm condition, e.g., detecting the loud breaking of a window, detecting the loud impact of an object to the vehicle and the like. As further described below, a plurality of sensors can be used to confirm the presence of an alarm condition. The use of a plurality of sensors will minimize false positives. For example, during a thunder storm, the loud thunder may trigger the potential detection of an alarm condition via a motion sensor and an audio sensor. However, the audio signal received via the audio sensor can be correlated to that of the benign sound of thunder so that the alarm condition would not be declared.

In one embodiment, a positioning sensor 212, e.g., a Global Positioning System (GPS), Globalnaya navigatsionnaya sputnikovaya sistema (GLONASS) or Global Navigation Satellite System (GNSS) receiver and the like is deployed to capture the current location information of the standalone area monitor 108. For example, when an alarm condition is detected, the positioning sensor 212 may capture the current location, e.g., GPS coordinates, of the standalone area monitor 108 and with the assistance of the wireless communication module transmits the current location to the application server 104. This will allow the standalone area monitor 108 to transmit a signal to the application server 104 to report an alarm condition and the current location of the standalone area monitor 108. Furthermore, the current location information of the standalone area monitor 108 can be broadcasted to a neighboring standalone area monitor 110. For example, a neighboring standalone area monitor 110 using the received GPS coordinates will be able to determine the location of the standalone area monitor 108 that is requesting assistance.

In one embodiment, a number of decisions can be made by the recipient device 110, e.g., the recipient device 110 may determine that the sender device 108 is simply too far to provide any assistance, or the recipient device 110 may determine that the sender device 108 is sufficiently close to provide some form of assistance, e.g., capturing images, sounding a car horn and the like. In one embodiment, the positioning sensor 212 may be activated even when there is no alarm condition. In other words, the positioning sensor may be part of the overall system that is tasked with the initial detection of the alarm condition, e.g., detecting a change in the physical location of the vehicle through successive coordinate readings or measurements, e.g., the car is being driven away or is being towed away and the like.

In one embodiment, a motion sensor 214, e.g., a passive infrared sensor (e.g., detecting sudden changes in heat signature), an ultrasonic sensor (e.g., measuring reflection of ultrasonic waves off objects), a microwave sensor (e.g., measuring reflection of electromagnetic pulses off objects), or an accelerometer, is used to detect motion associated with the standalone area monitor 108. For example, when an alarm condition is detected, the motion sensor 214 is used to determine whether there is a detectable or distinctive motion associated with the motion sensor. The detectable or distinctive motion may indicate that the vehicle is being entered or is being struck. Furthermore, the detectable or distinctive motion may indicate that the standalone area monitor 108 is being physically moved, e.g., when an intruder enters a vehicle or a tent and physically removes the standalone area monitor 108 itself. With the assistance of the wireless communication module, this will allow the standalone area monitor 108 to transmit a signal to the application server 104 to report an alarm condition and that the standalone area monitor 108 is currently being moved or the vehicle in which the standalone area monitor 108 is deployed is deemed to be moved.

Furthermore, the current movement information of the standalone area monitor 108 can be broadcasted to a neighboring standalone area monitor 110 as a request for assistance. For example, a neighboring standalone area monitor 110 situated at a neighboring tent, booth or stall may activate its sensors, e.g., a camera and a microphone, when the standalone area monitor 108 is requesting assistance. In one embodiment, the motion sensor 214 may be activated even when there is no alarm condition. In other words, the motion sensor 214 may be part of the overall system that is tasked with the initial detection of the alarm condition, e.g., detecting a significant motion (e.g., above a predefined threshold of prolong or continuous motion) of the vehicle through successive motion readings, e.g., the car is being driven away or is being towed away versus a sporadic shaking of the vehicle.

In one embodiment, a temperature sensor 216, e.g., a thermometer is used to detect a temperature of a monitored area. For example, in one embodiment, the temperature sensor 216 is used to assist in the detection of an alarm condition. In other words, the temperature sensor 216 may be part of the overall system that is tasked with the initial detection of the alarm condition, e.g., detecting a sudden rise in temperature of the monitored area, e.g., a fire in a stall in the barn, a fire at a campsite, a fire in a vehicle, and the like.

In one embodiment, a humidity sensor 218, e.g., a hygrometer, is used to detect a moisture level of a monitored area. For example, in one embodiment, the humidity sensor 218 is used to assist in the detection of an alarm condition.

In other words, the humidity sensor 218 may be part of the overall system that is tasked with the initial detection of the alarm condition, e.g., detecting a sudden rise in moisture of the monitored area, e.g., a flood in a stall in the barn, an opened window, sun roof or moon roof in vehicle during a storm, and the like.

In one embodiment, air quality sensor 220, e.g., a smoke detector, a carbon monoxide detector, a carbon dioxide detector, a methane detector, a hydrochloric acid detector, a radiation detector, a detector of a particular type of gas and the like is used to detect an air quality level of a monitored area. For example, in one embodiment, the air quality sensor 220 is used to assist in the detection of an alarm condition. In other words, the air quality sensor 220 may be part of the overall system that is tasked with the initial detection of the alarm condition, e.g., detecting a sudden rise in suspended particles within the monitored area, e.g., a smoky condition in a vehicle, a smoky condition in a stall in the barn, and the like.

In one embodiment, a vehicle interface module 222 is used to interact with the various existing systems of a vehicle. For example, a vehicle may have an alarm system, a navigation system, or a subscription based communications system, e.g., OnStar®. For example, when an alarm condition is detected, the vehicle interface module 222 may interact with the various existing systems of the vehicle, e.g., when a smoky condition is detected, the vehicle interface module 222 may interact with the alarm system to sound the vehicle horn and to flash the vehicle head lights. In another example, when a request for assistance is detected from a neighboring standalone area monitor, the vehicle interface module 222 may interact with the alarm system to sound the vehicle horn and to flash the vehicle head lights. In one embodiment, the vehicle interface module 222 may use a wireless communication protocol to communicate with the existing systems of the vehicle, or a hard wire connection, e.g., a receptacle, can be deployed within the vehicle to receive the standalone area monitor.

The standalone area monitor 108 also employs a power source 230, e.g., one or more batteries such as disposable batteries or rechargeable batteries. In one embodiment, the power source 230 can be coupled to the battery of a vehicle to extend the standalone area monitor's operating time. In one embodiment, based on the power source's current power capacity, one or more of the sensors and modules can be activated or deactivated.

In one embodiment, the standalone area monitor 108 employs one or more input devices 224, e.g., a speaker, a screen, buttons, and the like. These input/output devices allow a user to operate the various features of the standalone area monitor 108, e.g., for providing inputs to the standalone area monitor 108. For example, if the optional GUI 206 is not deployed, then various buttons can be used to manually initiate the alarm and/or to provide manual inputs. In another example, input/output devices 224 provide various outputs, e.g., an audible alarm, text to speech signals, and the like.

It should be noted that one feature of the standalone area monitor of the present disclosure is the portability and its standalone configuration or packaging. In other words, the standalone area monitor contains within itself the various sensors and communications modules. It is a "self contained" unit that can be easily transported from one location to another location.

Figure 3:
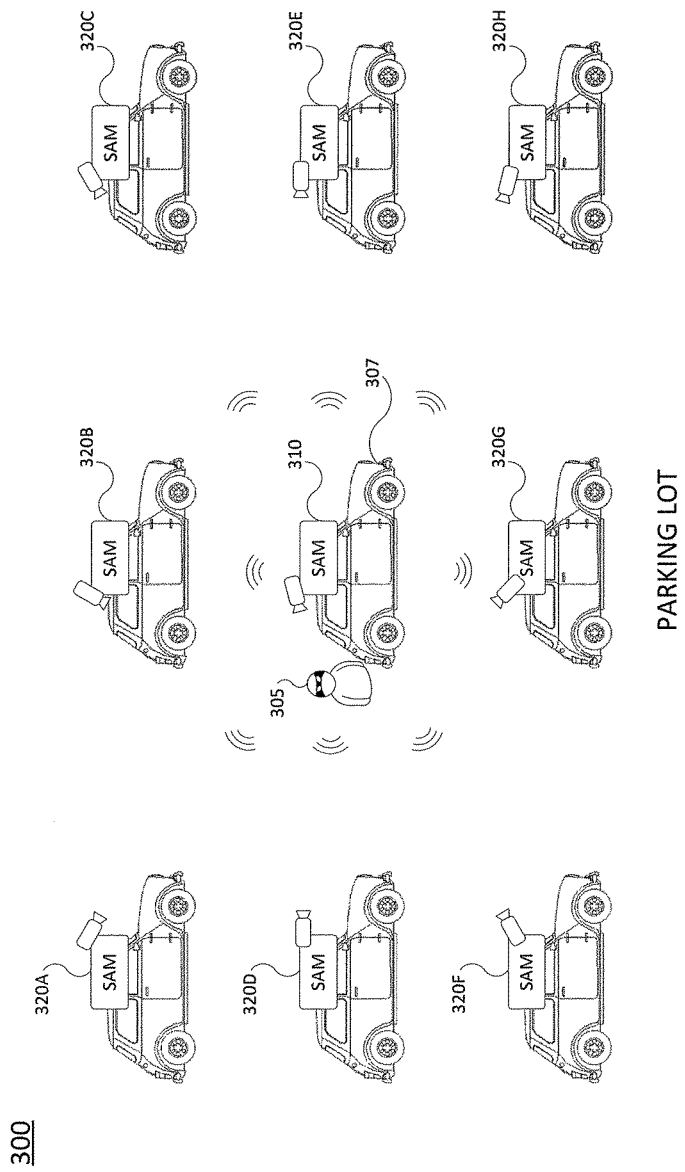
FIG. 3 illustrates the collaboration of a plurality of standalone area monitors of the present disclosure.

FIG. 3 illustrates the collaboration of a plurality of standalone area monitors, e.g., in a parking lot. In this illustrative example, an intruder 305 is attempting to break into a vehicle 307 that is being monitored by a standalone area monitor 310. Upon detecting the alarm condition, e.g., a break-in, the standalone area monitor 310 will activate its array of sensors as described above. Furthermore, the standalone area monitor 310 will solicit the assistance of the neighboring standalone area monitors 320A-H that are located within neighboring vehicles. Thus, upon breaking the window of vehicle 307, the standalone area monitor 310 will activate the alarm of vehicle 307. Simultaneously, neighboring standalone area monitors 320A-H will collaborate in assisting the standalone area monitor 310, e.g., by activating the alarm system of each respective vehicle, activating the camera of each respective standalone area monitor 320A-H, broadcasting respectively captured video of the break-in scene by each standalone area monitors 320A-H, and so on. This coordinated defense by the plurality of standalone area monitors 320A-H and 310 will likely deter an intruder from attacking any of the vehicles in the parking lot since there is a heighten chance that the intruder will be identified and subsequently apprehended for the offense.

Figure 4:
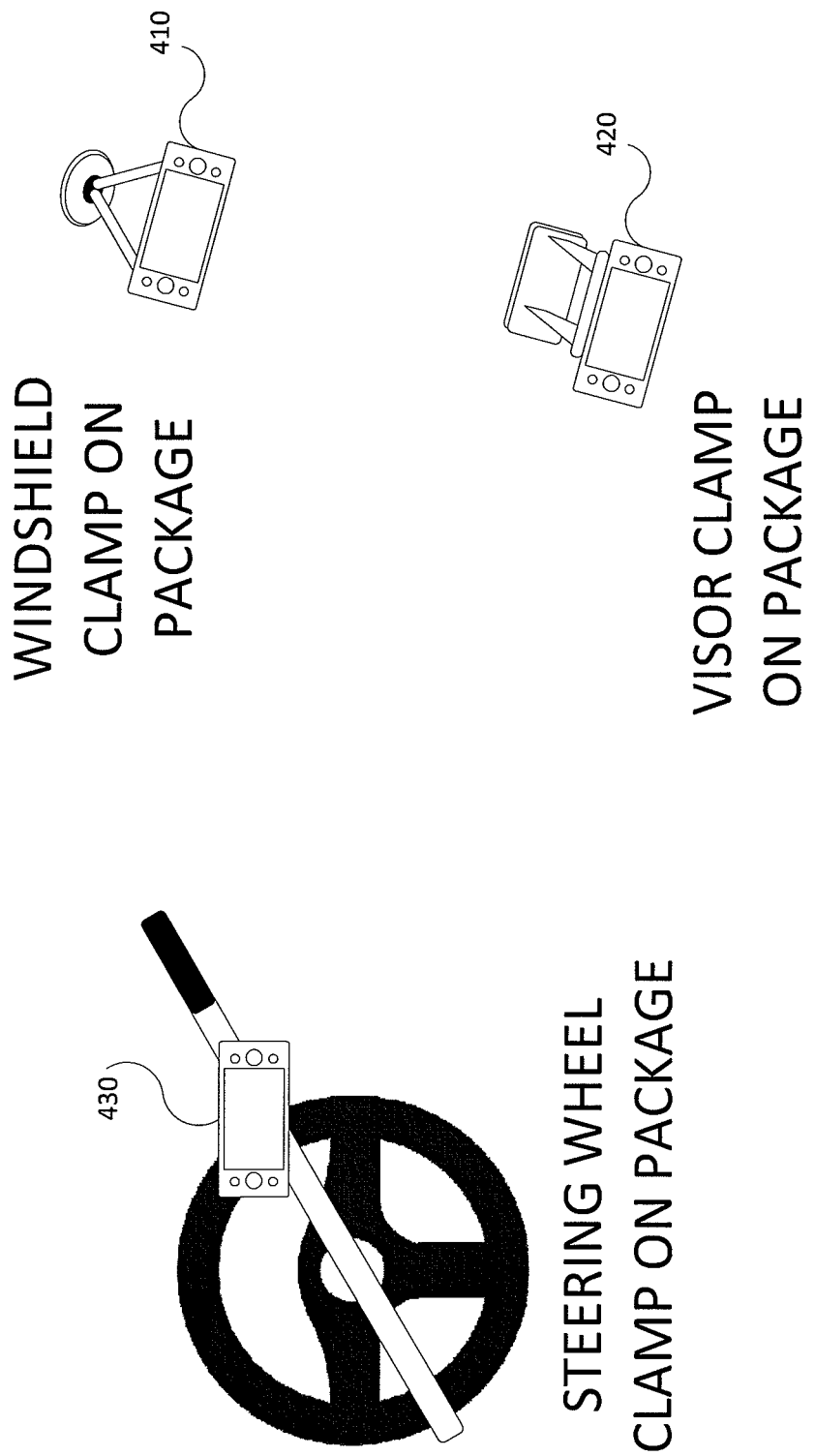
FIG. 4 illustrates several mounting configurations for the standalone area monitor of the present disclosure.

FIG. 4 illustrates several mounting configurations for the standalone area monitor. In one configuration 410, the standalone area monitor is coupled to a suction cup mounting assembly that will allow the standalone area monitor to be mounted on any glass surface. In another configuration 420, the standalone area monitor is coupled to a clamp or clip mounting assembly that will allow the standalone area monitor to be mounted on a visor type structure of the vehicle. In another configuration 430, the standalone area monitor is coupled to a steering wheel type clamp or clip mounting assembly that will allow the standalone area monitor to be mounted on the steering structure of the vehicle. In another configuration, the standalone area monitor is coupled to a chain assembly that will allow the standalone area monitor to be looped around a stable structure, e.g., a picnic table frame at a campsite, a table frame at a convention booth, a steel gate of a stall in a barn, and so on. The various configurations provide a range of installations that balance the need for portability and security. The present standalone area monitor is not limited to any particular installation configuration. The above configurations are provided only as examples.

Figure 5:
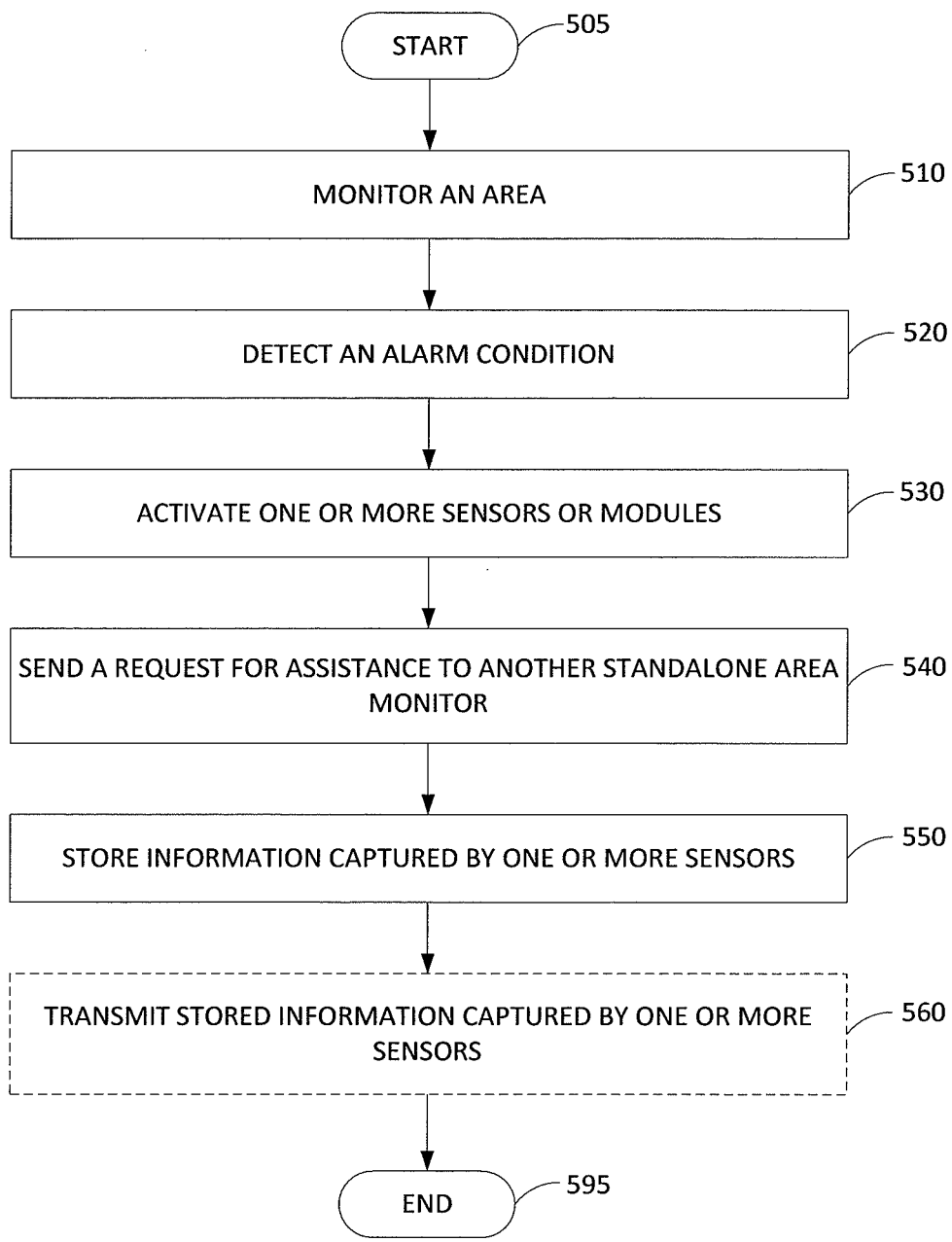
FIG. 5 illustrates an example flowchart of a method for communicating with another standalone area monitor of the present disclosure.

FIG. 5 illustrates an example flowchart of a method 500 for communicating with another standalone area monitor of the present disclosure. In one embodiment, the method 500 may be performed by the sending endpoint device (e.g., a sending standalone area monitor 108) or a general purpose computer as illustrated in FIG. 8 and discussed below.

The method 500 begins at step 505. At step 510, the method 500 monitors an area. For example, a standalone area monitor 108 is deployed and activated to monitor an area, e.g., a vehicle, or a non-vehicle location such as a tent, a booth, a stall, or a campsite. The use of the standalone area monitor 108 to monitor an area comprises the use of one or more sensors to detect a triggering condition, such as using a microphone to measure a sound level above a predefined threshold, the use of a motion detector to detect motion within the area, the use of a camera to detect a change in the captured imagery, and so on.

In step 520, method 500 detects an alarm condition. Broadly, the alarm condition may be detected when one or more triggering conditions are met. A non-exhaustive list of triggering conditions may comprise: a sound level above a predefined threshold, a motion being detected within the monitored area, a change in the captured imagery of the monitored area, a change in the physical location of the standalone area monitor above a predefined threshold, a change in the speed or acceleration of the standalone area monitor above a predefined threshold, a change in the temperature of the monitored area above a predefined threshold, a change in the moisture level of the monitored area above a predefined threshold, a change in the air quality level of the monitored area above a predefined threshold, and the like. It should be noted that one or more of the triggering conditions may need to be met before an alarm condition is declared. For example, the standalone area monitor 108 may be configured such that a break-in is declared when a change in the captured imagery of the monitored area is detected (e.g., confirmed by an optical sensor such as a camera) and a motion is detected within the monitored area (e.g., confirmed by a motion detector). Using a plurality of triggering conditions may reduce the number of instances of false positives for reporting the existence of an alarm condition.

A non-exhaustive list of alarm conditions may comprise: a break-in condition (e.g., an intruder entering a compartment of a vehicle, a tent or a booth), a collision condition (e.g., a violent jolt resulting from a parked vehicle being struck, e.g., by another moving vehicle), a theft condition (e.g., a vehicle being stolen or the standalone area monitor itself being stolen), a fire condition (e.g., a fire at a campsite), a water overflow condition (e.g., a vehicle compartment getting too much moisture), a poor air quality condition (e.g., a smoky, sandy or dusty condition), and the like. It should be noted that the above list of alarm conditions is only illustrative and additional alarm conditions can be defined based on a particular deployment of the standalone area monitor.

In step 530, method 500 activates one or more sensors or modules. For example, once an alarm condition is determined, the standalone area monitor will activate one or more sensors to address the alarm condition. Some of the sensors are intended to capture and produce one or more records of the alarm condition, e.g., capturing images of the intruder, capturing the sounds made by the intruder, recording the date and time that the alarm condition occurred (e.g., using time stamps with the recorded video and audio files), and so on. However, other sensors and modules are intended to deter the continuance of the alarm condition. For example, the positioning sensor (e.g., GPS receiver) may determine the current coordinates of the standalone area monitor and forward the coordinates via the wireless communication module to an application server to report the alarm condition. A service provider may then dispatch law enforcement officers to the coordinates reported by the standalone area monitor to address the alarm condition.

In step 540, method 500 sends a request for assistance to another standalone area monitor (broadly a recipient device). In one embodiment, the request can simply be a broadcast message that indicates the alarm condition. In another embodiment, the request may optionally provide the identification of the "sending" standalone area monitor (e.g., a unique alphanumeric string) and the current location of the "sending" standalone area monitor. In other words, the standalone area monitor may solicit the assistance of other neighboring standalone area monitors, e.g., requesting neighboring standalone area monitors to trigger their respective alarm systems in their respective vehicles, activating their respective sensors to record the alarm condition from their respective locations.

In step 550, method 500 stores the information captured by the one or more sensors, e.g., storing the captured images, videos, and/or sounds, for the alarm condition. For example, imagery and sound relating to a vehicle break-in can be captured and stored locally on the standalone area monitor.

In step 560, method 500 optionally transmits the information captured by the one or more sensors, e.g., transmitting the captured images, videos, and/or sounds, for the alarm condition to a remote application server. For example, imagery and sounds relating to a vehicle break-in can be captured and immediately sent to a remote application server, e.g., via cellular communication or Wi-Fi communication. It is likely that an intruder will detect the presence of the standalone area monitor and upon gaining entry to the vehicle, will likely attempt to disable the standalone area monitor as soon as possible. Thus, it is important that the captured information be offloaded from the standalone area monitor immediately. In one alternate embodiment, if the vehicle itself has a separate vehicle storage device, the captured information can be sent and stored at this separate vehicle storage device. Thus, even if the standalone area monitor is stolen or damaged after the break-in, the captured information may be recovered from the separate vehicle storage device. Method 500 ends in step 595 or returns to step 510.

Figure 6:
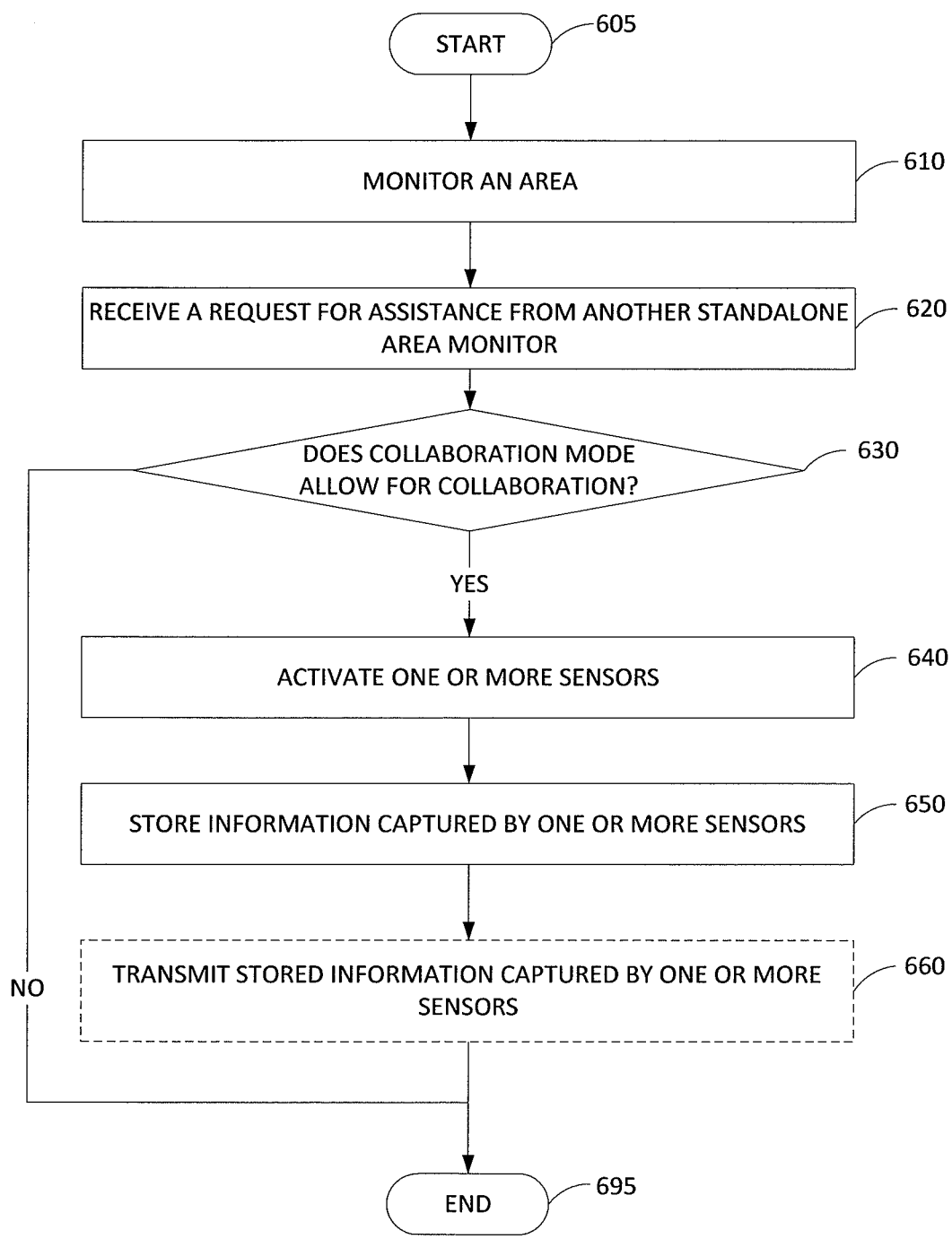
FIG. 6 illustrates another example flowchart of a method for communicating with another standalone area monitor of the present disclosure.

FIG. 6 illustrates an example flowchart of a method 600 for communicating with another standalone area monitor of the present disclosure. In one embodiment, the method 600 may be performed by the recipient endpoint device (e.g., a recipient standalone area monitor 110) or a general purpose computer as illustrated in FIG. 8 and discussed below.

The method 600 begins at step 605. At step 610, the method 600 monitors an area. For example, a standalone area monitor 110 is deployed and activated to monitor an area, e.g., a vehicle, or a non-vehicle location such as a tent, a booth, a stall, or a campsite. The use of the standalone area monitor 110 to monitor an area comprises the use of one or more sensors to detect a triggering condition, such as using a microphone to measure a sound level above a predefined threshold, the use of a motion detector to detect motion within the area, the use of a camera to detect a change in the captured imagery, and so on.

In step 620, method 600 receives a request for assistance from another standalone area monitor (broadly a sending device). In one embodiment, the request can simply be a broadcast message that indicates the alarm condition. In another embodiment, the request may optionally provide the identification of the "sending" standalone area monitor (e.g., a unique alphanumeric string) and the current location of the "sending" standalone area monitor. In other words, the standalone area monitor may solicit the assistance of other neighboring standalone area monitors, e.g., requesting neighboring standalone area monitors to trigger their respective alarm systems in their respective vehicles, activating their respective sensors to record the alarm condition from their respective locations.

In step 630, method 600 determines whether the selected collaboration mode allows the standalone area monitor 110 to provide assistance. For example, if the collaboration mode for the standalone area monitor 110 is set to "full collaboration" or "limited collaboration", then the standalone area monitor 110 is authorized to provide assistance. If the collaboration mode for the standalone area monitor 110 is set to "no collaboration", then the standalone area monitor 110 is not authorized to provide assistance. In addition to the collaboration mode setting, other considerations or parameters may dictate whether standalone area monitor 110 will be providing assistance. For example, if the power source of standalone area monitor 110 is deemed to be too low, then no assistance will be provided even when the collaboration mode indicates that standalone area monitor 110 is authorized to provide assistance. In another example, if the location of standalone area monitor 108 is deemed to be too far for the assistance to be effective, e.g., the vehicle associated with the standalone area monitor 108 is at a different level of a parking garage, then no assistance will be provided even when the collaboration mode indicates that standalone area monitor 110 is authorized to provide assistance. If the determination at step 630 is negative, method 600 ends in step 695. If the determination at step 630 is positive, method 600 proceeds to step 640.

In step 640, method 600 activates one or more sensors or modules. For example, once assistance is determined to be provided, the standalone area monitor 110 will activate one or more sensors to address the alarm condition. Some of the sensors are intended to capture and produce one or more records of the alarm condition, e.g., capturing images of the intruder, capturing the sounds made by the intruder, recording the date and time that the alarm condition occurred (e.g., using time stamps with the recorded video and audio files), and so on. However, other sensors and modules are intended to deter the continuance of the alarm condition. For example, the positioning sensor (e.g., GPS receiver) may determine the current coordinates of the standalone area monitor 110 and forward the coordinates via the wireless communication module to an application server to report the alarm condition of a neighboring standalone area monitor 108. A service provider may then dispatch law enforcement officers to the coordinates reported by the standalone area monitor to address the alarm condition.

In step 650, method 600 stores the information captured by the one or more sensors, e.g., storing the captured images, videos, and/or sounds, for the alarm condition. For example, imagery and sounds relating to a vehicle break-in can be captured and stored locally on the standalone area monitor 110. Unlike the situation of the standalone area monitor 108, it is less likely that an intruder will detect or will be concerned with the presence of the standalone area monitor 110 in another vehicle. In other words, since the intruder is pre-occupied with breaking into another vehicle, the intruder will be less concerned about the operation of the standalone area monitor 110. Thus, although the possibility exists, it is less likely that the intruder will attempt to disable the standalone area monitor 110 in another vehicle, especially if the provided assistance is "passive" monitoring, e.g., using the camera to capture the alarm condition versus an "active" defense such as sounding the horn of the vehicle monitored by the standalone area monitor 110. Thus, it is less urgent that the captured information be offloaded from the standalone area monitor 110 immediately. In one alternate embodiment, if the vehicle itself has a separate vehicle storage device, the captured information can be sent and stored at this separate vehicle storage device. Thus, even if the standalone area monitor 110 is stolen or damaged after the break-in, the captured information may be recovered from the separate vehicle storage device.

In step 660, method 600 may nevertheless optionally transmit the information captured by the one or more sensors, e.g., transmitting the captured images, videos, and/or sounds, for the alarm condition to a remote application server. For example, imagery and sounds relating to a vehicle break-in can be captured and sent to a remote application server, e.g., via cellular communication or Wi-Fi communication. Method 600 ends in step 695 or returns to step 610.

Figure 7:
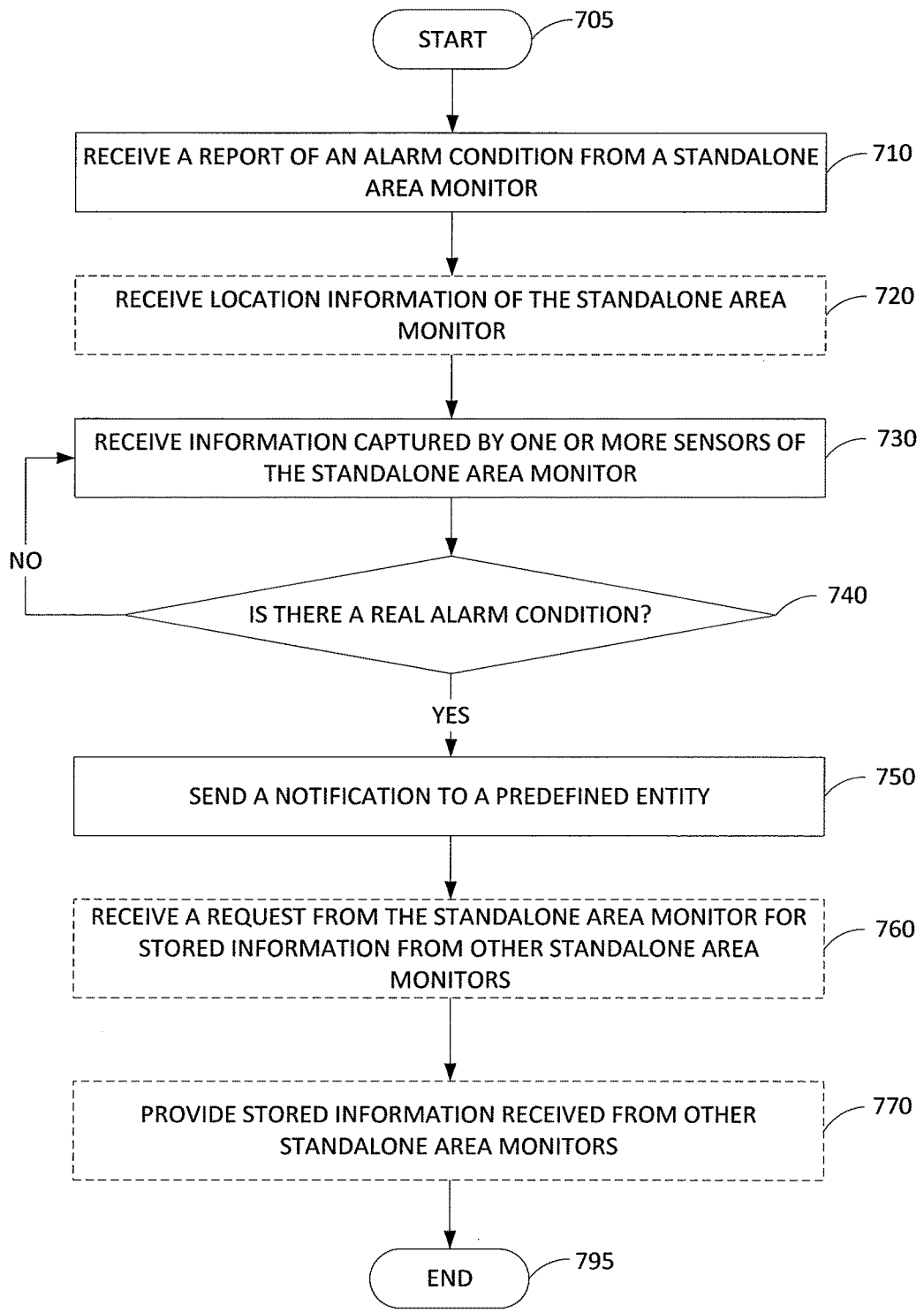
FIG. 7 illustrates an example flowchart of a method for communicating with a standalone area monitor of the present disclosure.

FIG. 7 illustrates an example flowchart of a method 700 for communicating with a standalone area monitor of the present disclosure. In one embodiment, the method 700 may be performed by the AS 104 or a general purpose computer as illustrated in FIG. 8 and discussed below. For example, AS 104 may be providing a monitoring service (e.g., a subscription based service) operated by the service provider of network 102. Thus, the users of standalone area monitors 108 and 110 may be current customers of the service provider and their service profile information are readily available to the service provider.

The method 700 begins at step 705. At step 710, the method 700 receives a report of an alarm condition from a standalone area monitor 108, or from the standalone area monitor 110 relaying the alarm condition on behalf of standalone area monitor 108.

In step 720, method 700 may optionally receive location information, e.g., GPS coordinates, pertaining to the standalone area monitor 108. In one alternate embodiment, the method 700 may itself deduce the location of standalone area monitor 108 via other methods, e.g., via a triangulation method using cellular tower signals and the like.

In step 730, method 700 receives information captured by the sensors of the standalone area monitor 108, and/or information captured by the sensors of a neighboring standalone area monitor 110. The information may comprise: images, videos, sound recordings, temperature readings or measurements, motion information, e.g., speed and/or acceleration measurements, humidity readings or measurements, air quality measurements, and the like.

In step 740, method 700 may analyze the received information to determine or verify the existence of the alarm condition. For example, an automated system may be used to quickly process the received information, e.g., using face detection algorithms to determine whether the captured imagery contains the face of an individual in a supposedly parked and empty vehicle, evaluating the temperature readings to determine whether the readings are sufficiently high to correlate the readings to that of a fire condition, correlating a local weather report proximate to the location of standalone area monitor 108 to determine whether high humidity readings can be correlated to a rain storm at that location, and the like. Thus, any number of automated evaluation methods can be deployed to process the received information. Alternatively, the received information can be forwarded to a human evaluator who is tasked with reviewing the received information to confirm the existence of the alarm condition, e.g., looking at the received video to determine whether an intruder is inside a vehicle. If method 700 does not confirm the alarm condition, then method 700 returns to step 730 to continue receiving more information or returns to step 710. If method 700 does confirm the alarm condition, then method 700 proceeds to step 750.

In step 750, method 700 sends a notification of the alarm condition to a predefined entity. In one embodiment, the predefined entity may comprise one or more of: the user of the standalone area monitor 108, a person designated by the user of the standalone area monitor 108, a law enforcement agency, e.g., the police department, a fire department, a medical response entity, e.g., a hospital or an ambulance providing entity, and the like.

In step 760, method 700 may optionally receive a request from the user of the standalone area monitor 108 for stored information from other standalone area monitors that may have provided assistance in terms of capturing information related to that particular episode or instance of alarm condition. For example, the user of the standalone area monitor 108 may find that his car was broken into during the night and the user may want to know if any of the neighboring standalone area monitors may have captured the break-in event. In one embodiment, the user of the standalone area monitor 108 will provide the unique identification for the standalone area monitor 108 and the time period associated with the break-in event, e.g., ID number "xyz1234" and time period for December 1, between 1:00 am-7:00 am.

In one embodiment, if the information from other standalone area monitors was received in step 730, then method 700 may use the ID number "xyz1234" and the time stamps associated with received information to obtain the requested information, if such information actually exists. In one embodiment, neighboring standalone area monitors would have received a request for assistance from standalone area monitor 108 that will include the unique ID number "xyz1234". As such, when captured information is uploaded to the application server, the unique ID number "xyz1234" will be embedded with the uploaded information. This will allow the application server 104 to catalog the received information based on one or more of: unique ID numbers of the standalone area monitors, time stamps, location information, and so on.

In one embodiment, the other standalone area monitors may have recorded the break-in event, but have not uploaded the captured information to the application server 104. As discussed before, uploading such vast amount of information may cause users of these other standalone area monitors to incur a substantial data transmission cost. Since that scenario is likely to be the case, the application server 104 may send out a request on behalf of the user of standalone area monitor 108 to these other standalone area monitors requesting that any captured data relating to ID number "xyz1234" and time period for December 1, between 1:00 am-7:00 am be uploaded to the application server 104. The request can be sent to all standalone area monitors, or the request can be sent only to those standalone area monitors within the proximate location of standalone area monitor 108.

In step 760, method 700 optionally provides the stored information to the user of standalone area monitor 108, when the stored information is received from other standalone area monitors. Method 700 ends in step 795.

In one embodiment, given the high cost of data transmission, the user of standalone area monitor 108 may be charged a monetary amount commensurate with the amount of data uploaded by the other neighboring standalone area monitors. In other words, in addition to a subscription charge for the monitoring service, the user of standalone area monitor 108 will bear the cost of his request for other standalone area monitors to upload their stored information. In one embodiment, the user may set an upper limit as to how much he is willing to pay for his request for such stored information, e.g., $50, $100, and so on. The application server may use this predefined upper limit to tailor the request for uploading the requested information in an organized manner, e.g., requesting one standalone area monitor at a time to upload the requested information based on proximity to the standalone area monitor 108 for the night in question. The application server will stop making any additional requests once the upper limit has been reached. In another embodiment, the application server may request the upload of information based on the type of access that the user is willing to pay. For example, the user of standalone area monitor 108 may indicate that he would like stored information from other standalone area monitors only when these other standalone area monitors are able to upload their stored information via a Wi-Fi network.

In one embodiment, the users of the other standalone area monitors will not incur any cost for uploading their stored information as discussed above. In another embodiment, the users of the other standalone area monitors may actually be paid, e.g., a bounty amount, for sharing their stored information. For example, the user of standalone area monitor 108 or even law enforcement agencies may have a strong interest in obtaining such vital stored information to solve various crimes. The awarding of such bounty will encourage the mass deployment of the standalone area monitors of the present disclosure. For example, it is often the case that a particular crime may have a posted reward that will be paid for information leading to the conviction of the responsible criminals. If stored information of one or more standalone area monitors is instrumental in leading to the conviction of the criminals, then a portion of the advertised reward can be paid to the users of these standalone area monitors. In one embodiment, the service provider may on its own accord provide a bounty to the users of these standalone area monitors for uploading their respective information to help other users. In one embodiment, the service provider may provide the bounty in terms of service credits, e.g., additional cellular access minutes or access to other service features, e.g., providing video conference call service for a predefined time period, increasing the monthly allotment of cellular minutes, increasing the amount of bandwidth relating to data transmission and the like.

Furthermore, the above embodiments are described when the standalone area monitors of the present disclosure are deployed remotely from their users. In other words, the users are not proximate to the standalone area monitors when these standalone area monitors are activated. However, the standalone area monitors can be manually activated by the users to take advantage of the features of the standalone area monitors. For example, if a user is travelling in a vehicle on a highway and the standalone area monitor is mounted on the dashboard of the vehicle, the user can dynamically activate the standalone area monitor to capture an event, e.g., a road rage event, an accident enfolding before the user, and the like.

It should be noted that although not explicitly specified, one or more steps or operations of the methods 500-700 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 5-7 that recite a determining operation, or involve a decision, do not necessarily require that both branches of the determining operation be practiced. In other words, one of the branches of the determining operation can be deemed as an optional step.

FIG. 8 depicts a high-level block diagram of a general-purpose computer suitable for use in performing the functions described herein. As depicted in FIG. 8, the system 800 comprises one or more hardware processor elements 802 (e.g., a central processing unit (CPU), a microprocessor, or a multi-core processor), a memory 804, e.g., random access memory (RAM) and/or read only memory (ROM), a module 805 for providing standalone area monitoring, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 805 for providing standalone area monitoring (e.g., a software program comprising computer-executable instructions) can be loaded into memory 804 and executed by hardware processor element 802 to implement the steps, functions or operations as discussed above in connection with the exemplary methods 500-700. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for providing standalone area monitoring (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for monitoring an area, the apparatus comprising:
 a processor of a standalone area monitor; and
 a computer-readable storage device storing a plurality of instructions which, when executed by the processor, cause the processor to perform operations, the operations comprising:
 monitoring the area via a plurality of sensors, wherein the plurality of sensors comprises an optical sensor, a positioning sensor and a first air quality sensor, wherein the area that is monitored via the plurality of sensors comprises a vehicle;
 detecting via the first air quality sensor an alarm condition, wherein the alarm condition comprises an air quality condition indicating a presence of a particular type of gas or a particular quantity of suspended particles;
 activating, in response to the alarm condition, the optical sensor to capture information associated with the alarm condition; and
 sending, in response to the alarm condition, a request for assistance to a neighboring standalone area monitor using a wireless communications protocol, wherein the request for assistance comprises a request for activating, by the neighboring standalone area monitor, at least one sensor of the neighboring standalone area monitor, wherein the at least one sensor of the neighboring standalone area monitor comprises a second air quality sensor.

2. The apparatus of claim 1, further comprising:
 storing the information that is captured in a local storage device.

3. The apparatus of claim 1, further comprising:
 transmitting the information that is captured to an application server.

4. The apparatus of claim 3, wherein the information is transmitted to the application server via a cellular access network.

5. The apparatus of claim 3, wherein the information is transmitted to the application server via a wireless-fidelity access network.

6. The apparatus of claim 1, wherein the information that is captured comprises an image associated with the alarm condition.

7. The apparatus of claim 1, wherein the information that is captured comprises a video associated with the alarm condition.

8. The apparatus of claim 1, wherein the operations further comprise:
 activating, in response to the alarm condition, an audio sensor, wherein the information that is captured comprises an audio file associated with the alarm condition.

9. The apparatus of claim 1, wherein the operations further comprise:
 activating, in response to the alarm condition, a temperature sensor, wherein the information that is captured comprises a temperature measurement associated with the alarm condition.

10. The apparatus of claim 1, wherein the operations further comprise:
 activating, in response to the alarm condition, a humidity sensor, wherein the information that is captured comprises a humidity measurement associated with the alarm condition.

11. The apparatus of claim 1, wherein the operations further comprise:
 activating, in response to the alarm condition, a motion sensor, wherein the information that is captured comprises a speed measurement associated with the alarm condition.

12. The apparatus of claim 1, wherein the operations further comprise:

activating, in response to the alarm condition, a motion sensor, wherein the information that is captured comprises an acceleration measurement associated with the alarm condition.

13. The apparatus of claim 1, wherein the plurality of sensors further comprises at least one of: an audio sensor, a motion sensor, a temperature sensor, and a humidity sensor.

14. The apparatus of claim 1, wherein the alarm condition further comprises at least one of: a break-in condition, a collision condition, a theft condition, a fire condition, and a water overflow condition.

15. The apparatus of claim 1, wherein the request contains an identification of the standalone area monitor.

16. An apparatus for monitoring an area, the apparatus comprising:
- a processor of a standalone area monitor; and
- a computer-readable storage device storing a plurality of instructions which, when executed by the processor, cause the processor to perform operations, the operations comprising:
  - monitoring the area via a plurality of sensors, wherein the plurality of sensors comprises an optical sensor, a positioning sensor and an air quality sensor, wherein the area that is monitored via the plurality of sensors comprises a vehicle;
  - receiving a request for assistance due to an alarm condition from a neighboring standalone area monitor using a wireless communications protocol, wherein the alarm condition comprises an air quality condition indicating a presence of a particular type of gas or a particular quantity of suspended particles;
  - determining whether the standalone area monitor is authorized to provide the assistance; and
  - activating the air quality sensor and the optical sensor to capture information associated with the alarm condition when providing the assistance is determined to be authorized.

17. A method for processing a report of an alarm condition, the method comprising:
- receiving, by a processor, the report of the alarm condition from a first standalone area monitor having a plurality of sensors that comprises a first optical sensor, a first positioning sensor and a first air quality sensor for monitoring an area, wherein the area that is monitored via the plurality of sensors comprises a vehicle, wherein the report is received via a wireless communication protocol, wherein the alarm condition comprises an air quality condition indicating a presence of a particular type of gas or a particular quantity of suspended particles;
- receiving, by the processor, first information captured by the first air quality sensor and the first optical sensor associated with the alarm condition;
- receiving, by the processor, second information captured by a second air quality sensor and a second optical sensor of a second neighboring standalone area monitor, wherein the second information captured by the second air quality sensor and the second optical sensor is associated with the alarm condition that is reported by the first standalone area monitor;
- analyzing, by the processor, the first information captured by the first air quality sensor and the first optical sensor and the second information captured by the second air quality sensor and the second optical sensor to verify the alarm condition; and
- sending, by the processor, a notification of the alarm condition to a predefined entity when the alarm condition is verified.

18. The method of claim 17, further comprising:
storing the information that is captured in a local storage device.

19. The method of claim 17, further comprising:
transmitting the information that is captured to an application server.

20. The method of claim 19, wherein the information is transmitted to the application server via a cellular access network.

* * * * *